(12) United States Patent
Iwata et al.

(10) Patent No.: US 9,328,811 B2
(45) Date of Patent: May 3, 2016

(54) DRIVE PLATE AND MANUFACTURING METHOD FOR THE SAME

(75) Inventors: Daisuke Iwata, Nishio (JP); Tomoyuki Hori, Anjo (JP); Naoki Yokoyama, Nishio (JP); Koji Obayashi, Toyoake (JP); Keita Taguchi, Agui (JP); Hiroshi Shibata, Takahama (JP)

(73) Assignee: AISIN AW CO., LTD., Anjo (JP)

( * ) Notice: Subject to any disclaimer, the term of this patent is extended or adjusted under 35 U.S.C. 154(b) by 1053 days.

(21) Appl. No.: 13/447,826

(22) Filed: Apr. 16, 2012

(65) Prior Publication Data

US 2012/0297910 A1 Nov. 29, 2012

(30) Foreign Application Priority Data

May 24, 2011 (JP) ................. 2011-116086

(51) Int. Cl.
| | |
|---|---|
| *F16H 55/17* | (2006.01) |
| *F16H 41/24* | (2006.01) |
| *C21D 9/32* | (2006.01) |
| *C23C 8/22* | (2006.01) |
| *F16H 55/06* | (2006.01) |
| *B21D 53/28* | (2006.01) |
| *C23C 8/02* | (2006.01) |

(Continued)

(52) U.S. Cl.
CPC ................ *F16H 41/24* (2013.01); *B21D 53/28* (2013.01); *C21D 9/32* (2013.01); *C22C 38/00* (2013.01); *C23C 8/02* (2013.01); *C23C 8/22* (2013.01); *C23C 8/80* (2013.01); *F16H 55/06* (2013.01); *F16H 55/17* (2013.01); *Y10T 74/1987* (2015.01)

(58) Field of Classification Search
CPC ........... B21D 53/28; F16H 55/06; C21D 9/32
See application file for complete search history.

(56) References Cited

U.S. PATENT DOCUMENTS

| | | | | |
|---|---|---|---|---|
| 4,885,831 A | * | 12/1989 | Fett ......................... | C21D 9/32 148/573 |
| 5,310,432 A | | 5/1994 | Fukui et al. | |

(Continued)

FOREIGN PATENT DOCUMENTS

| | | |
|---|---|---|
| JP | A-06-323399 | 11/1994 |
| JP | A-09-144849 | 6/1997 |

(Continued)

OTHER PUBLICATIONS

Jun. 12, 2012 International Search Report issued in Application No. PCT/JP2012/060311 (with translation).

*Primary Examiner* — William Kelleher
*Assistant Examiner* — Jake Cook
(74) *Attorney, Agent, or Firm* — Oliff PLC

(57) ABSTRACT

A drive plate includes a disk-shaped plate portion; and a tooth-shaped portion formed at an outer peripheral end of the plate portion. The plate portion and the tooth-shaped portion are integrally shaped from a single steel plate material. The plate portion and the tooth-shaped portion include a carburized layer provided over an entire surface layer of the plate portion and the tooth-shaped portion, the carburized layer having a carbon concentration higher than that of a center portion of the plate portion and the tooth-shaped portion in a thickness direction. The carburized layer of the plate portion is higher in hardness than the center portion of the plate portion in the thickness direction. The carburized layer of the tooth-shaped portion has been subjected to a quenching process, and is further higher in hardness than the carburized layer of the plate portion.

4 Claims, 5 Drawing Sheets

(51) Int. Cl.
*C23C 8/80* (2006.01)
*C22C 38/00* (2006.01)

(56) References Cited

U.S. PATENT DOCUMENTS

| | | | | | |
|---|---|---|---|---|---|
| 5,562,785 | A | * | 10/1996 | Yamanaka | B21H 5/02 148/573 |
| 5,830,095 | A | * | 11/1998 | Takamori | B23P 15/14 29/892 |
| 6,330,836 | B1 | * | 12/2001 | Watanabe | C22C 38/04 148/586 |
| 2009/0101246 | A1 | * | 4/2009 | Ohbayashi | C21D 9/32 148/570 |
| 2009/0266449 | A1 | * | 10/2009 | Ohbayashi | C21D 1/18 148/222 |
| 2009/0301608 | A1 | * | 12/2009 | Taniguchi | C21D 1/00 148/319 |
| 2012/0211126 | A1 | * | 8/2012 | Zhang | C21D 1/10 148/508 |
| 2012/0305143 | A1 | * | 12/2012 | Wessman | B23P 15/006 148/516 |

FOREIGN PATENT DOCUMENTS

| | | |
|---|---|---|
| JP | A-10-259447 | 9/1998 |
| JP | A-2001-020016 | 1/2001 |
| JP | A-2001-200348 | 7/2001 |
| JP | A-2002-286117 | 10/2002 |
| JP | A-2008-175306 | 7/2008 |
| JP | A-2009-007603 | 1/2009 |
| JP | A-2010-281419 | 12/2010 |

* cited by examiner

F I G . 6
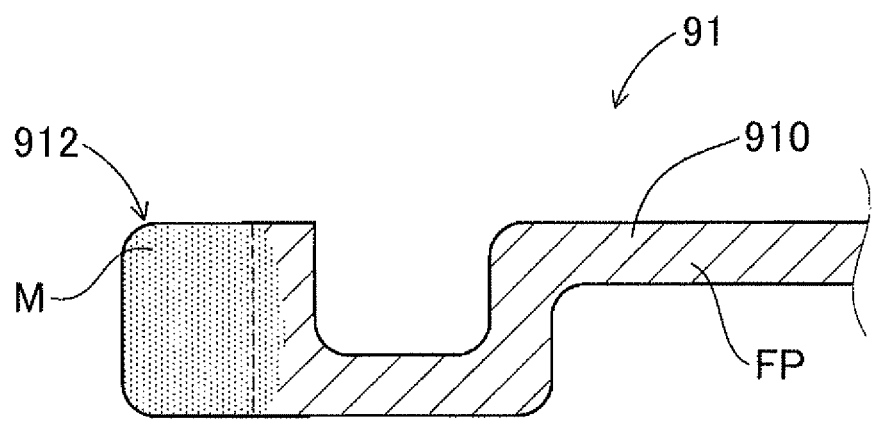
F I G . 7
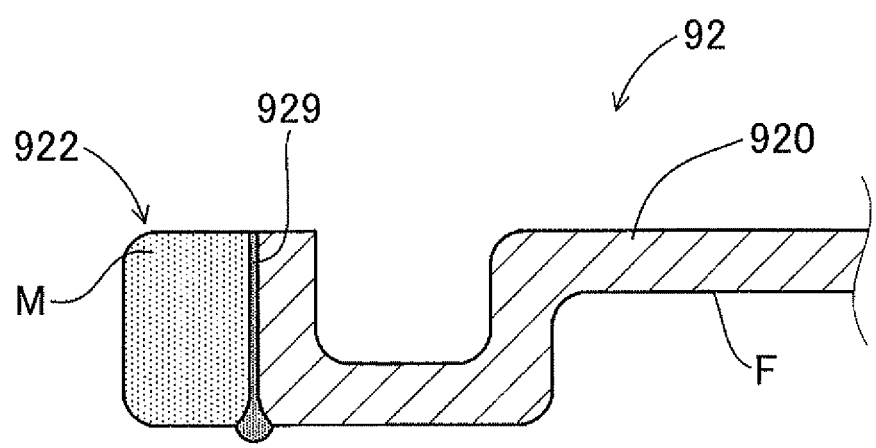

DRIVE PLATE AND MANUFACTURING METHOD FOR THE SAME

INCORPORATION BY REFERENCE

The disclosure of Japanese Patent Application No. 2011-116086 filed on May 24, 2011 including the specification, drawings and abstract is incorporated herein by reference in its entirety.

BACKGROUND OF THE INVENTION

The present invention relates to a drive plate and a manufacturing method for the drive plate.

DESCRIPTION OF THE RELATED ART

A drive plate is an example of members used to transfer a rotational force of a starter motor to an engine of a vehicle or the like. The drive plate includes a plate portion fixed to a rotary shaft of the engine, and a tooth-shaped portion provided at the outer peripheral end of the plate portion to engage with a gear of the starter motor. In a vehicle including an automatic transmission, the drive plate is also used to couple the rotary shaft of the engine and a rotary shaft of the automatic transmission to each other.

In a manufacturing method for the drive plate known in the art, the plate portion and the tooth-shaped portion described above are fabricated separately from each other to be finally joined to each other (see Japanese Patent Application Publication No. 2010-281419 (JP 2010-291419 A)). For the purpose of rationalizing manufacturing steps, it is proposed to integrally shape the plate portion and the tooth-shaped portion described above from a single plate material (see Japanese Patent Application Publication No. 2002-286117 (JP 2002-286117 A)).

SUMMARY OF THE INVENTION

It is necessary to use a steel plate with a carbon concentration exceeding 0.3% by mass as a raw material of the drive plate integrally shaped from a single plate material according to the related art, because the tooth-shaped portion is finally subjected to a quenching process. Such a steel plate has high material strength compared to a general steel plate for pressing with a relatively low carbon concentration, and therefore requires an expensive pressing device that supports a high load to shape the plate portion and the tooth-shaped portion by press forming. This raises the capital investment cost, which makes it difficult to sufficiently reduce the product cost.

In recent years, on the other hand, requirements for the performance of the drive plate have become severer than before, and it has become necessary to harden the tooth-shaped portion more than in the related art. In order to meet the requirements to harden the above tooth-shaped portion, it is necessary to adopt a steel plate with a higher carbon concentration as the raw material. However, this leads to an increase in manufacturing cost due to further deterioration of pressing formability.

The present invention has been made against such background, and has an object to provide a drive plate with both a hardened tooth-shaped portion and a reduced manufacturing cost and a manufacturing method for the drive plate.

An aspect of the present invention provides a drive plate including: a disk-shaped plate portion; and a tooth-shaped portion formed at an outer peripheral end of the plate portion, in which: the plate portion and the tooth-shaped portion are integrally shaped from a single steel plate material; the plate portion and the tooth-shaped portion include a carburized layer provided over an entire surface layer of the plate portion and the tooth-shaped portion, the carburized layer having a carbon concentration higher than that of a center portion of the plate portion and the tooth-shaped portion in a thickness direction; the carburized layer of the plate portion is higher in hardness than the center portion of the plate portion in the thickness direction; and the carburized layer of the tooth-shaped portion has been subjected to a quenching process, and is further higher in hardness than the carburized layer of the plate portion.

Another aspect of the present invention provides a manufacturing method for a drive plate, including: a shaping step in which a blank material stamped from a single steel plate material is subjected to pressing to obtain a shaped article integrally including a disk-shaped plate portion and a tooth-shaped portion formed at an outer peripheral end of the plate portion; a carburizing step in which the shaped article is heated to an austenitizing temperature or more in a carburizing atmosphere to form a carburized layer over an entire surface layer of the plate portion and the tooth-shaped portion, the carburized layer having a carbon concentration higher than that of a center portion of the plate portion and the tooth-shaped portion in a thickness direction; a cooling step, subsequent to the carburizing step, in which the shaped article is cooled at a cooling rate less than a cooling rate at which martensitic transformation is caused and to a temperature equal to or less than a temperature at which structure transformation due to the cooling is completed; and a quenching step in which the tooth-shaped portion is heated to an austenitizing range by high-density energy and thereafter cooled at a cooling rate equal to or more than the cooling rate at which martensitic transformation is caused.

In the above drive plate, as described above, the plate portion and the tooth-shaped portion include a carburized layer provided over the entire surface layer of the plate portion and the tooth-shaped portion, the carburized layer having a carbon concentration higher than that of the center portion of the plate portion and the tooth-shaped portion in the thickness direction. Therefore, the concentration of carbon in the center portion of the above plate portion in the thickness direction interposed between the carburized layers may be set to be lower than that in the related art. Then, a portion provided with high strength by the carburized layer on the surface improves the overall tensile strength with the low-carbon region maintaining high toughness. Therefore, the plate portion of the above drive plate can achieve strength characteristics with tensile strength equal to or more than that of a plate portion formed by high-carbon steel and not including a carburized layer according to the related art.

The carburized layer of the above tooth-shaped portion has been subjected to the quenching process, and thus the tooth-shaped portion has a surface layer hardened compared to the carburized layer of the plate portion. The center portion of the tooth-shaped portion in the thickness direction can be maintained in a low-carbon state, and thus has high toughness. Such a configuration allows an improvement in surface hardness and toughness of the above tooth-shaped portion compared to that of the drive plate according to the related art, and provides the above tooth-shaped portion with high durability.

The plate portion and the tooth-shaped portion of the above drive plate are integrally shaped from a single steel plate material. Here, by positively adopting a configuration in which the plate portion and the tooth-shaped portion have the above carburized layer, the amount of carbon in the steel plate material can be reduced to a minimum to significantly improve pressing formability compared to an integrally shaped article according to the related art. This allows rationalization of manufacturing steps, and makes the above obtained drive plate inexpensive compared to that according to the related art because of a cost reduction due to the rationalization of the manufacturing steps and a cost reduction due to the steel plate material itself.

The manufacturing method for the above drive plate includes at least the shaping step, the carburizing step, the cooling step, and the quenching step described above. The manufacturing method facilitates fabrication of the excellent drive plate discussed above. One thing to be noted about the manufacturing method is that the above carburizing step is not directly followed by the quenching process but by the above particular cooling step.

In the cooling step, the above shaped article is cooled at a cooling rate less than a cooling rate at which martensitic transformation is caused and to a temperature equal to or less than a temperature at which structure transformation due to the cooling is completed. This makes it possible to minimize generation of thermal distortion of the above shaped article after the carburizing process due to the cooling.

In the above subsequent quenching step, further, the above tooth-shaped portion is subjected to a local quenching process in which high-density energy is used. This makes it possible to suppress thermal distortion caused in the above shaped article (drive plate). Thus, the drive plate obtained in accordance with the manufacturing method is excellent in dimensional accuracy with little generation of thermal distortion.

BRIEF DESCRIPTION OF THE DRAWINGS

FIG. 6 is an illustration showing the state of structure inside a drive plate according to Comparative Example 1; and FIG. 7 is an illustration showing the state of structure inside a drive plate according to Comparative Example 2.

DETAILED DESCRIPTION OF THE EMBODIMENTS

Figure 1:
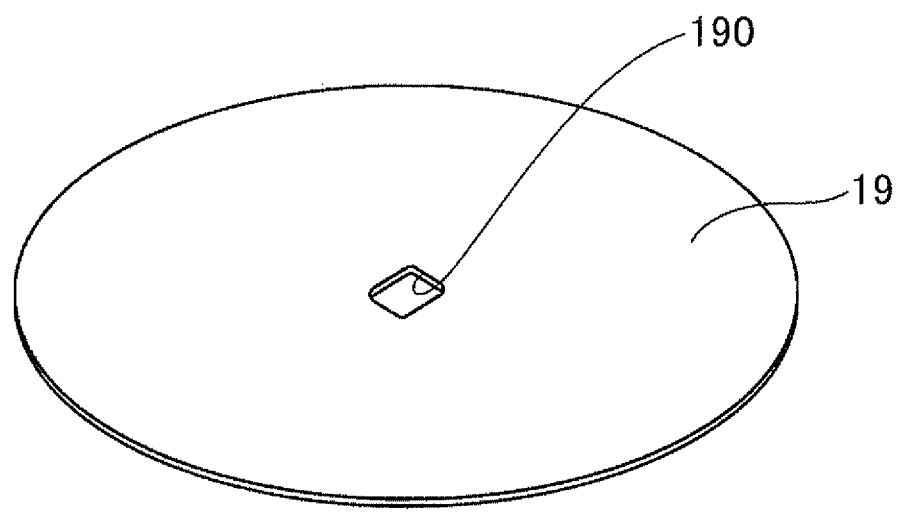
FIG. 1 is a perspective view showing a blank material according to a first embodiment.

The above drive plate may be configured such that the center portion of the above plate portion and the above tooth-shaped portion in the thickness direction has a carbon concentration of equal to or less than 0.2% by mass and such that the above carburized layer has a carbon concentration exceeding 0.2% by mass. That is, the steel plate material may have a carbon concentration of equal to or less than 0.2% by mass, which makes it possible to reliably improve pressing formability during manufacture. The carbon concentration of the carburized layer can be adjusted in accordance with conditions for a carburizing process, but is set to be at least higher than that of the center portion in the thickness direction. In order to improve the strength of the plate portion to a moderate level and improve the quenching characteristics of the tooth-shaped portion, the carbon concentration of the carburized layer is preferably 0.3% by mass or more, more preferably 0.4% by mass or more. In order to prevent excessive carburization, the upper limit of the carbon concentration of the carburized layer is preferably set to 0.9% by mass.

The center portion of the above plate portion in the thickness direction may have a ferrite structure, the above carburized layer of the above plate portion may have a pearlite structure, and the above carburized layer of the above tooth-shaped portion may have a martensite structure. Such a configuration of the internal structures makes it easy to obtain toughness and strength suitable for each of the plate portion and the tooth-shaped portion.

The above tooth-shaped portion may have a surface hardness of equal to or more than 700 HV. That is, the tooth-shaped portion includes the carburized layer as described above, and thus the surface hardness of the tooth-shaped portion can be improved relatively easily without reducing formability even though the drive plate is an integrally shaped article. Therefore, the surface hardness of the above drive plate can be significantly improved, compared to an integrally shaped article according to the related art which has an average hardness of 500 to 650 HV, by adjusting the concentration of carbon and the quenching conditions in the carburized layer.

In the manufacturing method for the above drive plate, the concentration of carbon in the above steel plate material may be made equal to or less than 0.2% by mass. That is, as discussed above, the strength characteristics may be improved by performing at least the carburizing step, the cooling step, and the quenching step described above, and thus the strength of the steel plate material itself may be set to be low. Then, by making the concentration of carbon in the steel plate material equal to or less than 0.2% by mass, it is possible to improve pressing workability in the shaping step, reduce the scale of a pressing device, reduce facility costs, and rationalize the other steps.

Examples of the pressing device which performs the above shaping step include a transfer press device that performs a plurality of processing steps while moving a shaped article along an arrangement of a plurality of dies. Development of a double-action pressing device enables a plurality of processing steps to be performed by single pressing.

In addition, the above carburizing step is preferably performed in a low-oxygen carburizing atmosphere in which the oxygen concentration is lower than that in the atmosphere. Specifically, the method may be performed in a decompressed carburizing gas, the pressure of which has been reduced to be lower than the atmospheric pressure, for example. That is, it is effective to adopt a decompressed carburizing step. In the decompressed carburizing step, the carburizing process can be performed using a relatively small amount of the carburizing gas while maintaining the inside of a carburizing furnace at a high temperature in a decompressed state. Thus, the carburizing process can be performed more efficiently than in the related art. In addition, a heating process performed in the related art over a long time using a large heat treatment furnace is no longer necessary. Thus, it is possible to reduce processing time, energy consumption, and further the size of the carburizing/quenching apparatus itself.

By adopting the decompressed carburization, it is possible to reduce the pressure of the carburizing atmosphere in the carburizing step with respect to the atmospheric pressure, which suppresses the amount of oxygen in the atmosphere to be low. This prevents intergranular oxidation of the carburized layer.

The method for carburization performed in a carburizing atmosphere, the oxygen concentration of which is lower than the atmosphere, is not limited to the decompressed carburization described above. For example, a nitrogen gas or an inert gas may be charged, rather than reducing the pressure of the atmosphere, to suppress the amount of oxygen in the atmosphere to be low to prevent intergranular oxidation of the carburized layer.

The above decompressed carburization is also referred to as vacuum carburization, and is a carburizing process performed with the pressure of the atmosphere in the furnace reduced and with a hydrocarbon gas directly introduced into the furnace as the carburizing gas. In general, a decompressed carburizing process includes a carburizing period in which activated carbon generated as a carburizing gas contacts a surface of steel to be decomposed becomes a carbide on the surface of the steel to be accumulated in the steel, and a diffusion period in which the carbide is decomposed so that the accumulated carbon is dissolved in a matrix to be diffused inward. It is said that the carbon is not only supplied by way of the carbide, but also directly dissolved in the matrix.

In addition, the above carburizing step is preferably performed under a decompression condition at 1 to 100 hPa. In the case where the decompressed carburizing step is adopted and the pressure during the carburization is reduced to be less than 1 hPa, an expensive apparatus may be required to maintain the degree of vacuum. In the case where the pressure during the decompressed carburization exceeds 100 hPa, on the other hand, soot may be generated during the carburization to cause unevenness in carburization concentration.

As the above carburizing gas, hydrocarbon gases such as acetylene, propane, butane, methane, ethylene, and ethane, for example, may be used.

Examples of the above high-density energy used as a heat source in the above quenching step include a high-density energy beam such as an electron beam and a laser beam and non-beam high-density energy such as high-frequency heating. Utilizing high-density energy enables short-time heating and local heating.

EMBODIMENT

First Embodiment

The drive plate and the manufacturing method for the drive plate according to an embodiment will be described with reference to FIGS. 1 to 5.

Figure 2:
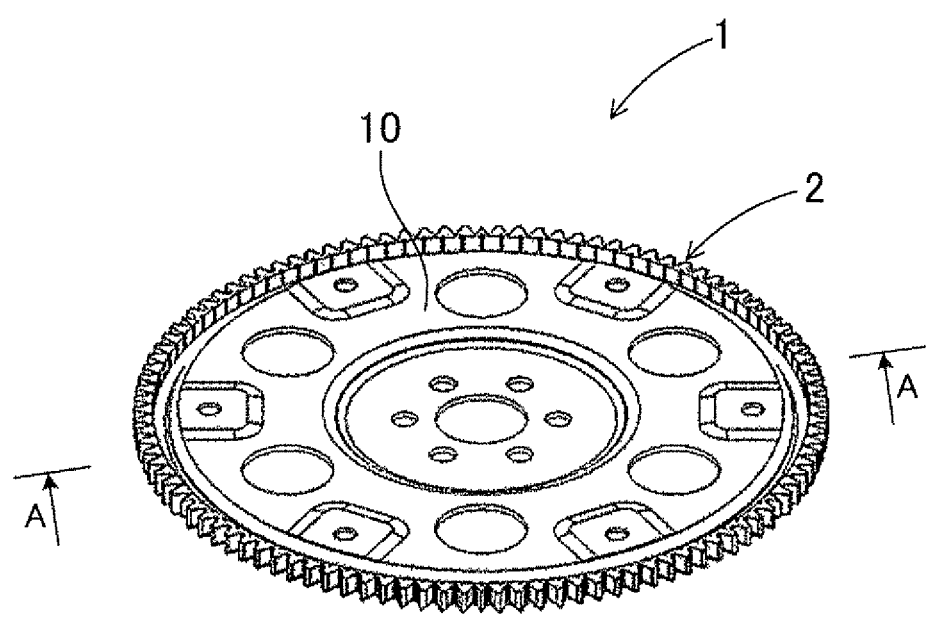
FIG. 2 is a perspective view showing a drive plate according to the first embodiment.
Figure 5:
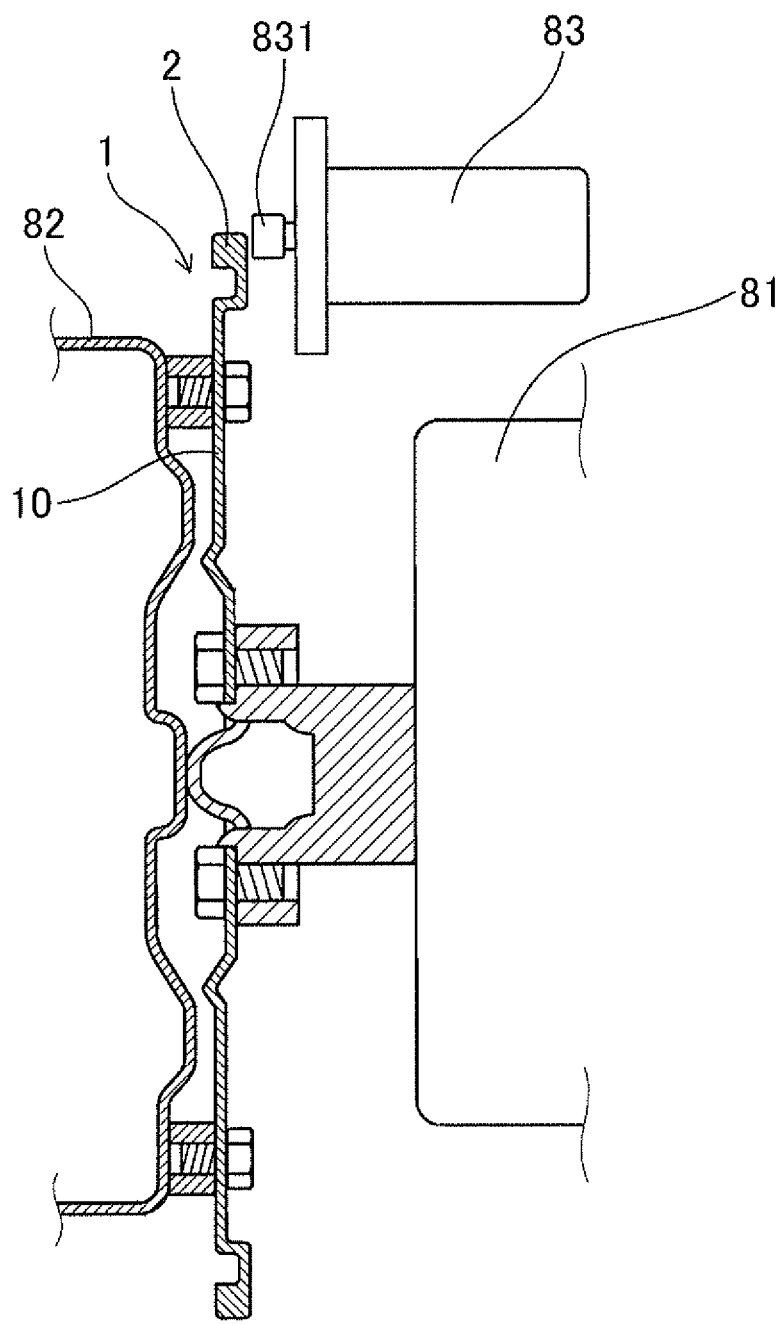
FIG. 5 is an illustration showing an example of use of the drive plate according to the first embodiment.

As shown in FIG. 2, a drive plate 1 according to the embodiment is a drive plate for a vehicle including a disk-shaped plate portion 10 and a tooth-shaped portion 2 formed at the outer peripheral end of the plate portion 10. As shown in FIG. 5, the drive plate 1 is used with the plate portion 10 disposed between an engine 81 and an automatic transmission 82 of an automobile, both of which are coupled to the plate portion 10. A starter motor 83 is disposed in the vicinity of the tooth-shaped portion 2 at the outer peripheral portion of the drive plate 1, and a gear portion 831 of the starter motor 83 engages with the above tooth-shaped portion 2 as appropriate.

Figure 3:
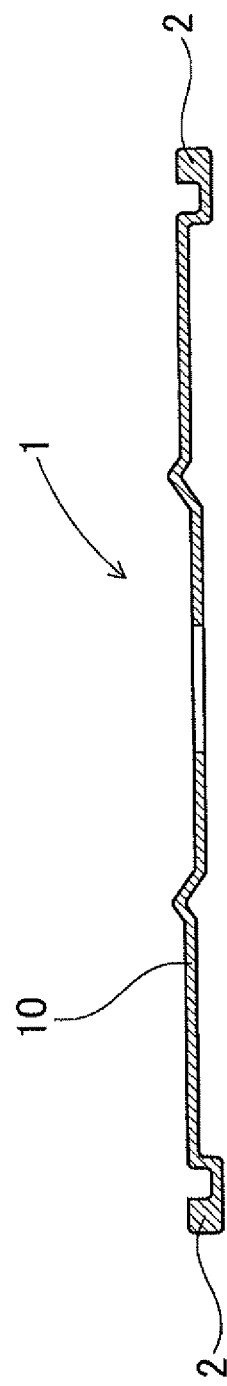
FIG. 3 is a cross-sectional view of the drive plate according to the first embodiment (a cross-sectional view taken along the line A-A of FIG. 2)
Figure 4:
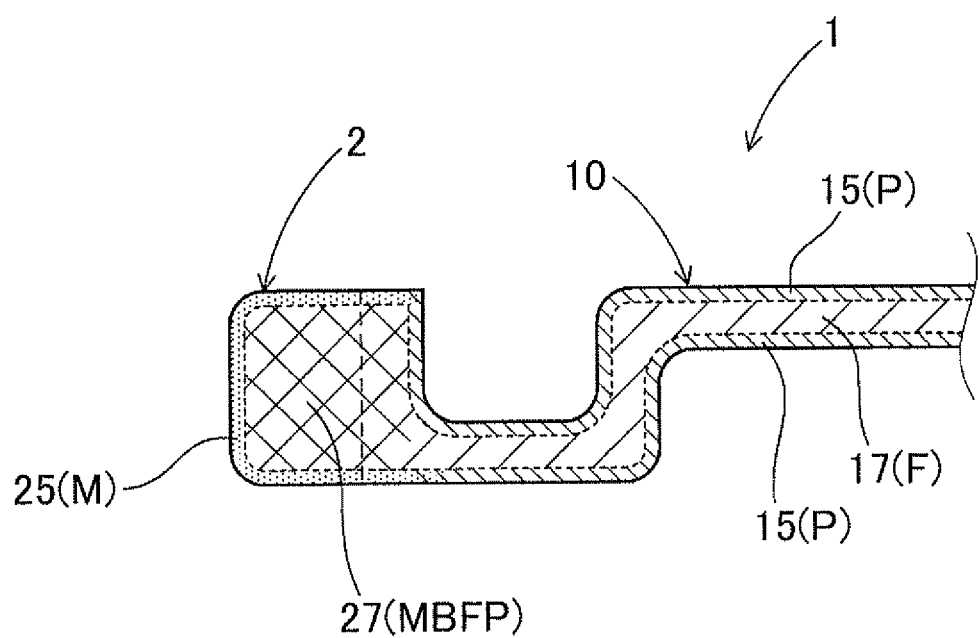
FIG. 4 is an illustration showing the state of structure inside the drive plate according to the first embodiment.

As shown in FIGS. 1 to 3, the plate portion 10 and the tooth-shaped portion 2 of the drive plate 1 are integrally shaped from a single steel plate material (blank material 19). As shown in FIG. 4, the plate portion 10 and the tooth-shaped portion 2 include carburized layers 15 and 25 provided over the entire surface layer of the plate portion 10 and the tooth-shaped portion 2, respectively, the carburized layers 15 and 25 having a carbon concentration higher than that of the center portion of the plate portion 10 and the tooth-shaped portion 2 in the thickness direction. The carburized layer 15 of the plate portion 10 has not been subjected to a quenching process, but is higher in hardness than a center portion 17 of the plate portion 10 in the thickness direction. The carburized layer 25 of the tooth-shaped portion 2 has been subjected to a quenching process, and is further higher in hardness than the carburized layer 15 of the plate portion 10. Structure observation has revealed that the center portion 17 of the plate portion 10 in the thickness direction has a ferrite structure F, the carburized layer 15 of the plate portion 10 has a pearlite structure, the carburized layer 25 of the tooth-shaped portion 2 has a martensite structure M, and a center portion 27 of the tooth-shaped portion 2 in the thickness direction has a mixed structure of martensite, bainite, ferrite, and pearlite (MBFP). That is, with focus on the carburized layers, it has been found that the carburized layer 15 of the plate portion 10 does not include a martensite structure M, and the carburized layer 25 of the tooth-shaped portion 2 has a martensite structure M.

In order to manufacture the drive plate 1, first, a shaping step in which the blank material 19 stamped from a single steel plate material is subjected to pressing to obtain a shaped article integrally including a disk-shaped plate portion and a tooth-shaped portion formed at the outer peripheral end of the plate portion. As the steel plate material, a material with a carbon concentration of about 0.1% by mass (material: SPH 370) was used. The blank material 19 is formed in the shape of a disk provided with a rectangular positioning hole 190 at the center, and is subjected to a plurality of processes using the positioning hole 190 as a reference. In the embodiment, a newly developed double-action pressing device (not shown) is used to perform a plurality of processing steps in single pressing. The obtained shaped article (drive plate) 1 integrally includes the disk-shaped plate portion 10 including a plurality of through holes 12 and the tooth-shaped portion 2 including a large number of tooth portions 21 formed to extend outward.

Next, heat treatment including a carburizing step, a cooling step, and a quenching step is performed on the shaped article 1. The heat treatment is performed on the shaped article 1 using a decompressed carburizing/slow-cooling device including a heating chamber, a decompressed carburizing chamber, and a decompressed slow-cooling chamber and a heat treatment apparatus (not shown) including a high-frequency quenching machine.

The above carburizing step is a step in which the shaped article 1 is heated to an austenitizing temperature or more in a carburizing atmosphere to form a carburized layer over the entire surface layer of the plate portion 10 and the tooth-shaped portion 2, the carburized layer having a carbon concentration higher than that of the center portion of the plate portion 10 and the tooth-shaped portion 2 in the thickness direction. Specifically, the shaped article 1 is heated to a retention temperature equal to or more than the austenitizing temperature, and thereafter retained in a decompressed carburizing atmosphere to be subjected to processes in the carburizing period and the diffusion period. The degree of decompression of the decompressed carburizing atmosphere is set to 1 to 3.5 hPa, and acetylene is used as the carburizing gas. The condition for the carburizing step according to the embodiment is set with a target carbon concentration of 0.3% by mass, which exceeds 0.2% by mass, at a depth of 500 μm from the surface layer of the carburized layer forming the surface layer of the obtained shaped article 1.

After the diffusion period of the decompressed carburizing process is terminated, and subsequent to the decompressed carburizing process, the cooling step, in which the shaped article 1 is cooled at a cooling rate less than a cooling rate at which martensitic transformation is caused and to a temperature equal to or less than a temperature at which structure transformation due to the cooling is completed, is performed. In the embodiment, a decompressed slow-cooling step is adopted as the cooling step, and the decompression condition for the decompressed slow-cooling step is set to 600 hPa. Nitrogen ($N_2$) is used as a cooling atmosphere gas. The cooling rate for the decompressed slow-cooling step is set in the range of 0.1 to 3.0° C./second during a period over which the temperature is reduced from the temperature equal to or more than the austenitizing temperature immediately after the carburizing process to a temperature of 150° C. which is lower than an A1 transformation point. The heat pattern and the conditions for the carburizing step and the cooling step described here are merely illustrative, and may be changed to conditions optimum for the material of the shaped article 1 through a preliminary test or the like as appropriate.

After the cooling step, the quenching step, in which the tooth-shaped portion 2 is heated to an austenitizing range by high-density energy and thereafter cooled at a cooling rate equal to or more than the cooling rate at which martensitic transformation is caused, is performed. In the above quenching step according to the embodiment, high-frequency heating is used as heating means, and water cooling in which cooling water is injected to a heated portion is used as rapid-cooling means. The cooling water for water cooling may be normal water. However, cooling water containing an anti-quenching crack agent may also be used. The heat pattern and the conditions for the quenching step may be changed to conditions optimum for the material of the shaped article 1 through a preliminary test or the like as appropriate.

When other processes such as machining for a finish, application of anti-rust oil, and various tests are performed after the above quenching step, the drive plate 1 as a product is obtained. As described above, the plate portion 10 and the tooth-shaped portion 2 of the obtained drive plate 1 include the carburized layers 15 and 25 provided over the entire surface layer of the plate portion 10 and the tooth-shaped portion 2, respectively, the carburized layers 15 and 25 having a carbon concentration higher than that of the center portion of the plate portion 10 and the tooth-shaped portion 2 in the thickness direction. Therefore, the concentration of carbon in the center portion 17 of the plate portion 10 in the thickness direction interposed between the carburized layers 15 may be set to be lower than that in the related art. Then, a portion provided with high strength by the carburized layer 15 on the surface improves the overall tensile strength with the low-carbon region maintaining high toughness. Therefore, the plate portion 10 of the drive plate 1 can achieve shock resistance higher than that of a plate portion 910 of a drive plate 91 formed by high-carbon steel and not including a carburized layer according to the related art described in relation to Comparative Example 1 discussed later, and can achieve strength characteristics with tensile strength equal to or more than that of the plate portion 910 according to the related art.

The carburized layer 25 of the tooth-shaped portion 2 of the drive plate 1 has been subjected to the quenching process, and thus the tooth-shaped portion 2 of the drive plate 1 has a surface layer hardened compared to the carburized layer 15 of the plate portion 10. The center portion 27 of the tooth-shaped portion 2 in the thickness direction can be maintained in a low-carbon state, and thus has high toughness. Such a configuration allows an improvement in surface hardness and toughness of the tooth-shaped portion 2 compared to that of the drive plate 91 according to the related art, and provides the tooth-shaped portion 2 with high durability.

The plate portion 10 and the tooth-shaped portion 2 of the drive plate 1 are integrally shaped from a single steel plate material. Here, by positively adopting a configuration in which the plate portion 10 and the tooth-shaped portion 2 have the carburized layers 15 and 25, respectively, the amount of carbon in the steel plate material can be reduced to a minimum to significantly improve pressing formability compared to an integrally shaped article according to the related art. This allows rationalization of manufacturing steps, and also allows a reduction in cost of the above obtained drive plate compared to that according to the related art because of a cost reduction due to the rationalization of the manufacturing steps and a cost reduction due to the steel plate material itself.

The manufacturing method for the drive plate 1 according to the embodiment includes at least the shaping step, the carburizing step, the cooling step, and the quenching step described above. The manufacturing method makes it possible to obtain the drive plate 1 which is not only excellent in mechanical characteristics discussed above but also excellent in dimensional accuracy with little generation of thermal distortion.

That is, in the above manufacturing method, the carburizing step is not directly followed by the quenching process but by the above particular cooling step. In the cooling step, as discussed above, the shaped article (drive plate) 1 is cooled at a cooling rate less than a cooling rate at which martensitic transformation is caused and to a temperature equal to or less than a temperature at which structure transformation due to the cooling is completed. This makes it possible to minimize generation of thermal distortion of the shaped article 1 after the carburizing process due to the cooling.

In the above subsequent quenching step, further, the tooth-shaped portion 2 is subjected to a local quenching process in which high-density energy is used. This makes it possible to suppress thermal distortion and distortion due to structure transformation caused in the shaped article (drive plate) 1. Thus, the obtained drive plate 1 is excellent in dimensional accuracy with little deformation due to the heat treatment.

Next, in order to quantitatively evaluate the excellent characteristics of the drive plate 1 according to the first embodiment, drive plates 91 and 92 according to the following two comparative examples (Comparative Examples 1 and 2) were prepared, and subjected to various tests.

Comparative Example 1

The drive plate 91 according to Comparative Example 1 was obtained by integrally shaping a plate portion 910 and a tooth-shaped portion 912 formed at the outer peripheral end of the plate portion 910 by press forming using a steel plate material (material: S35C) with a carbon concentration of 0.32 to 0.38% by mass. The tooth-shaped portion 912 has been subjected to high-frequency quenching as in the first embodiment. No carburized layer with a higher carbon concentration is formed. As a result of observing the cross-sectional structure of the drive plate 91 according to Comparative Example 1, as shown in FIG. 6, the entire plate portion 910 has a ferrite-pearlite structure FP, and the generally entire tooth-shaped portion 912 has a martensite structure M.

Comparative Example 2

The drive plate 92 according to Comparative Example 2 was obtained by separately shaping a plate portion 920 and a tooth-shaped portion 922 from separate materials and finally welding the plate portion 920 and the tooth-shaped portion 922 to each other at a welded portion 929. The plate portion 920 of the drive plate 92 is shaped by press forming using a steel plate material (material: SPH440) with a carbon concentration of about 0.09% by mass. The tooth-shaped portion 922 is fabricated by shaping a steel material (material: S48C) with a carbon concentration of 0.45 to 0.51% by mass into a ring-shaped article and performing a cutting process to form a gear at the outer peripheral portion of the ring-shaped article. The inner peripheral side of the tooth-shaped portion 922 is welded to the outer peripheral end of the plate portion 920, and the tooth-shaped portion 922 has been subjected to high-frequency quenching as in the first embodiment. No carburized layer with a higher carbon concentration is formed. As a result of observing the cross-sectional structure of the drive plate 92 according to Comparative Example 2, as shown in FIG. 7, the entire plate portion 920 has a ferrite structure F, and the generally entire tooth-shaped portion 922 has a martensite structure M. A region in the vicinity of the welded portion 929 on the circumference has been affected by heat during the welding to be transformed into tempered martensite and reduced in hardness.

Test Example

For testing, first, a test to measure the surface hardness of the tooth-shaped portions 2, 912, and 922 of the drive plates 1, 91, and 92 according to the first embodiment and Comparative Examples 1 and 2, respectively, was conducted. As a result of the measurement, it was found that the tooth-shaped portion 2 according to the first embodiment had a hardness of 750 HV and exhibited significantly excellent hardness characteristics, in contrast to the tooth-shaped portion 912 according to Comparative Example 1 which had a hardness in the range of 500 to 650 HV and the tooth-shaped portion 922 according to Comparative Example 2 which had a hardness of 700 HV.

Next, a test to measure the cross-sectional hardness of the plate portions 10, 910, and 920 of the drive plates 1, 91, and 92 according to the first embodiment and Comparative Examples 1 and 2, respectively, was conducted. As a result of the measurement, the center portion 17 of the plate portion 10 according to the first embodiment in the thickness direction had a hardness of 130 HV, and a portion of the plate portion 10 according to the first embodiment at a depth of 200 μm from the surface layer of the carburized layer 15 had a hardness in the range of 150 to 200 HV, in contrast to the plate portion 910 according to Comparative Example 1 which had a hardness of 150 HV and the plate portion 920 according to Comparative Example 2 which had a hardness of 160 HV.

Next, a test to measure the tensile strength of respective portions of the plate portions 10, 910, and 920 of the drive plates 1, 91, and 92 according to the first embodiment and Comparative Examples 1 and 2 was conducted. As a result of the measurement, using the tensile strength of the portion of the plate portion 920 of the drive plate 92 according to Comparative Example 2 as a reference value, the portion of the plate portion 910 of the drive plate 91 according to Comparative Example 1 had a tensile strength 1.1 times the reference value, and the portion of the plate portion 10 of the drive plate 1 according to the first embodiment had a tensile strength 1.2 times the reference value.

From the results of the various tests described above, it is found that the drive plate 1 according to the first embodiment has comprehensively excellent characteristics compared to those according to Comparative Examples 1 and 2.

Next, the cost to manufacture each drive plate was considered. The drive plates are compared for the manufacturing cost including the raw material cost. It was found that using the manufacturing cost of the drive plate 92 according to Comparative Example 2 as a reference, the manufacturing cost of the drive plate 91 according to Comparative Example 1 could be reduced compared to the reference, and that the manufacturing cost of the drive plate 1 according to the first embodiment could be further reduced compared to the reference.

Next, the drive plate 1 according to the first embodiment and the drive plate 91 according to Comparative Example 1 were compared for a press forming load applied to shape each drive plate. As a result, it was found that using the pressing load applied to shape the drive plate 91 according to Comparative Example 1 as a reference, the pressing load for the drive plate 1 according to the first embodiment could be reduced by 20%.

What is claimed is:

1. A drive plate comprising:
a disk-shaped plate portion; and
a tooth-shaped portion formed at an outer peripheral end of the plate portion, wherein:
the plate portion and the tooth-shaped portion are integrally shaped from a single steel plate material;
the plate portion and the tooth-shaped portion include a carburized layer provided over an entire surface layer of the plate portion and the tooth-shaped portion, the carburized layer having a carbon concentration higher than that of a center portion of the plate portion and the tooth-shaped portion in a thickness direction;
the carburized layer of the plate portion is higher in hardness than the center portion of the plate portion in the thickness direction; and
the carburized layer of the tooth-shaped portion has been subjected to a quenching process, and is further higher in hardness than the carburized layer of the plate portion,
wherein the center portion of the plate portion in the thickness direction has a ferrite structure, the carburized layer of the plate portion has a pearlite structure, and the carburized layer of the tooth-shaped portion has a martensite structure.

2. The drive plate according to claim 1, wherein
the center portion of the plate portion and the tooth-shaped portion in the thickness direction has a carbon concentration of equal to or less than 0.2% by mass, and the carburized layer has a carbon concentration exceeding 0.2% by mass.

3. The drive plate according to claim 1, wherein
the tooth-shaped portion has a surface hardness of equal to or more than 700 HV.

4. The drive plate according to claim 2, wherein
the tooth-shaped portion has a surface hardness of equal to or more than 700 HV.

* * * * *